H. R. WARNER.
COMBINED ROLLER AND BALL BEARING.
APPLICATION FILED AUG. 31, 1915.

1,186,252.

Patented June 6, 1916.

Witnesses
N. S. Waller
D. E. Waller

Inventor
Harold R. Warner.
By W. X. Stevens.
Attorney

UNITED STATES PATENT OFFICE.

HAROLD R. WARNER, OF SEATTLE, WASHINGTON, ASSIGNOR OF ONE-HALF TO BERT E. RAILSON, OF SEATTLE, WASHINGTON.

COMBINED ROLLER AND BALL BEARING.

1,186,252.   Specification of Letters Patent.   Patented June 6, 1916.

Application filed August 31, 1915. Serial No. 48,365.

*To all whom it may concern:*

Be it known that I, HAROLD R. WARNER, a citizen of the United States, residing at Seattle, in the county of King and State of Washington, have invented certain new and useful Improvements in Combined Roller and Ball Bearings, of which the following is a specification.

This invention relates to antifrictional devices for the running parts of machinery, and its object is to provide for such axles as have to be soft in order to be sufficiently tough to sustain the strains they are subject to, with hardened roller and ball bearings to support weight and to resist endwise thrust in service, such for example, as the bearings of automobile wheels.

Figure 1:
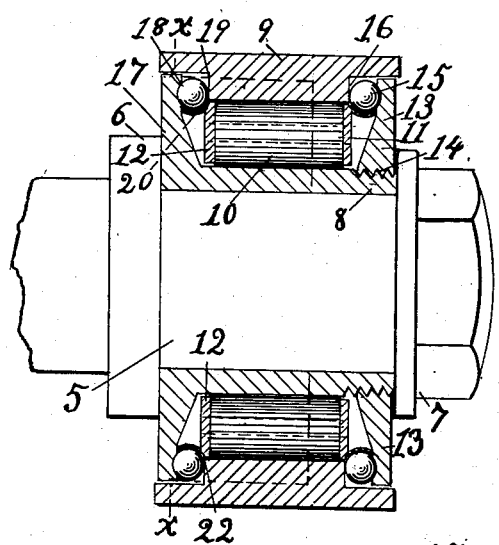
Figure 2:
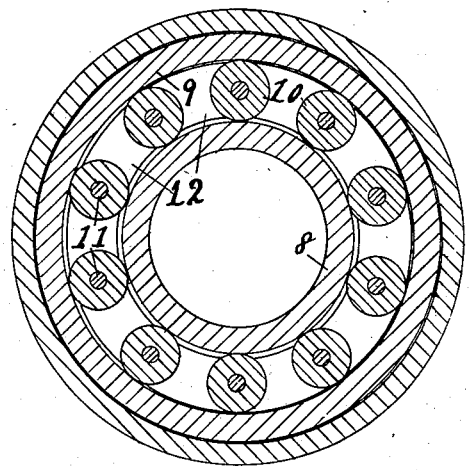
Figure 3:
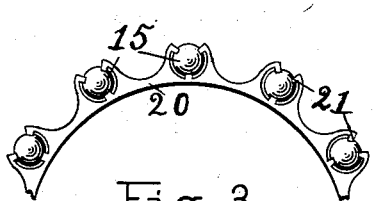

To this end my invention consists in the construction and combination of parts forming a combined roller and ball bearing hereinafter more fully described and particularly stated in the claims, reference being had to the accompanying drawings in which:

Figure 1, shows in longitudinal section, a combined roller and ball bearing according to my invention, as applied to a vehicle axle. Fig. 2, shows a transverse section on the irregular line *x*, Fig. 1. Fig. 3, is a detail view of a fragmentary portion thereof.

Let numeral 5 represent an axle bearing having the usual collar 6 at one end, and screw nut 7 at the other. A sleeve 8, of hard material, is fixed firmly upon the axle, and a bushing 9, also of hard material, is firmly fitted into the wheel that runs on the axle. Between this sleeve and bushing and in contact with both, I mount a series of rollers 10, on shafts 11 that are fitted at their ends into two rings 12. A collar 13 is screwthreaded at 14 upon the sleeve 8, to serve as the adjustable bearing for a set of balls 15 that roll between this collar and a shoulder 16 of the bushing 9.

A flange 17 of the sleeve 8 serves as a bearing for a set of balls 18 that roll against a shoulder 19 on the bushing 9. The balls are kept at a due distance apart by means of annular cages 20, having prongs 21 that partially surround each ball. The two rings 12 are firmly secured together by the shafts 11 being riveted to them, thus forming a cage by which all the rollers 10 may be kept in place, or be taken out of the bearing or returned as a unit. The outer corner 21 of each ring 12 is beveled to bear against the balls at its side in rolling contact when the cage is moved endwise out of its normal path. The endwise thrust of the wheel when running on a sidling path or when skidding, is resisted by the balls rolling between the shoulders 16, 19, and the collar 13 and flange 17, and the screwthread 14 enables nice adjustment of the collar 13 to prevent any leeway along the axle.

The flange 17 may be integral with the sleeve 8, as shown, or it may be secured to the sleeve in any usual manner, for example, as by a screwthread 14.

This device has the advantage of a long bearing of cylindrical rollers upon hardened tracks to carry the weight of vehicle and load, and of balls mounted in a manner to roll freely at right angles to their plane of circular travel to resist endwise thrust. The device is simple, mechanical, effective, and inexpensive. It is adaptable to any vehicle or machine having wheels turning on shafts or axles.

I claim;

1. In a combined roller and ball bearing, a sleeve having a flange at one end; a collar screwthreaded upon the other end; a bushing surrounding the body of the said sleeve to engage a wheel hub; rollers between the said bushing and sleeve; a cage for the rollers comprising annular end pieces and shafts rigidly fixed therein, the said shafts serving as bearings for the said rollers, and balls between the said cage and flange at one end and between the said cage and collar at the other end.

2. In a combined roller and ball bearing, a sleeve having collarlike attachments; a bushing having internal shoulders; rollers between the said sleeve and bushing; a cage for the rollers comprising annular end pieces rigidly secured together; a set of balls arranged to travel between the said collar-like attachments at one side and both the said cage and internal shoulders at the other side, whereby each set of balls serves as an end bearing to both the said bushing and cage.

In testimony whereof I affix my signature in presence of two witnesses.

HAROLD R. WARNER.

Witnesses:
C. E. CURTIS,
H. RICHMOND.